(12) United States Patent
Wagh et al.

(10) Patent No.: US 7,001,860 B2
(45) Date of Patent: Feb. 21, 2006

(54) CONSTRUCTION MATERIAL AND METHOD

(75) Inventors: Arun S. Wagh, Orland Park, IL (US); Allison L. Antink, Bolingbrook, IL (US)

(73) Assignee: The University of Chicago, Chicago, IL (US)

( * ) Notice: Subject to any disclaimer, the term of this patent is extended or adjusted under 35 U.S.C. 154(b) by 257 days.

(21) Appl. No.: 10/335,462

(22) Filed: Dec. 30, 2002

(65) Prior Publication Data

US 2006/0003886 A1    Jan. 5, 2006

(51) Int. Cl.
 *C04B 35/447* (2006.01)
(52) U.S. Cl. .................. 501/111; 106/690; 106/691; 525/190; 525/329.7; 525/332.3; 525/168
(58) Field of Classification Search ............. 525/165, 525/168, 190, 329.7, 332.3; 501/111; 106/690, 106/691
See application file for complete search history.

(56) References Cited

U.S. PATENT DOCUMENTS

| 5,234,754 | A | * | 8/1993 | Bache ..................... 428/332 |
| 5,645,518 | A | | 7/1997 | Wagh et al. |
| 5,830,815 | A | | 11/1998 | Wagh et al. |
| 5,846,894 | A | | 12/1998 | Singh et al. |
| 6,133,498 | A | | 10/2000 | Singh et al. |
| 6,153,809 | A | | 11/2000 | Singh et al. |
| 6,518,212 | B1 | * | 2/2003 | Wagh et al. .............. 501/111 |
| 2002/0123422 | A1 | | 9/2002 | Wagh et al. |

FOREIGN PATENT DOCUMENTS

JP    2001-231848    *   8/2001

OTHER PUBLICATIONS

Bohner et al., Gentamicin Release from a Hydraulic Calcium Phosphate Cement . . . , 3$^{rd}$ General Meeting of the Swiss Society of Biomaterials, May 1997.*

* cited by examiner

Primary Examiner—James J. Seidleck
Assistant Examiner—Irina S. Zemel
(74) Attorney, Agent, or Firm—Emrich & Dithmar, LLC.

(57) ABSTRACT

A structural material of a polystyrene base and the reaction product of the polystyrene base and a solid phosphate ceramic. The ceramic is applied as a slurry which includes one or more of a metal oxide or a metal hydroxide with a source of phosphate to produce a phosphate ceramic and a poly (acrylic acid or acrylate) or combinations or salts thereof and polystyrene or MgO applied to the polystyrene base and allowed to cure so that the dried aqueous slurry chemically bonds to the polystyrene base. A method is also disclosed of applying the slurry to the polystyrene base.

18 Claims, 3 Drawing Sheets

US 7,001,860 B2

CONSTRUCTION MATERIAL AND METHOD

The United States Government has rights in this invention pursuant to Contract No. W-31-109-ENG-38 between the U.S. Department of Energy and The University of Chicago representing Argonne National Laboratory.

TECHNICAL FIELD

This invention relates to forming polymer modified chemically bonded phosphate ceramics. In particular, this invention addresses a need to form a room-temperature-setting ceramic based on the conventional Ceramicrete® and Ferroceramicrete technology that will bond polymeric surfaces such as Styrofoam.

BACKGROUND OF THE INVENTION

Haematite, having the chemical formula $Fe_2O_3$, is one of the most abundant minerals in nature. It exists as iron ore, in other minerals such as bauxite, and is also a component in clay minerals. It is the major component in laeritic soils (red soils found in the tropics). Similarly, manganese oxide, having a formula $Mn_2O_3$ is also a very common component in several laeritic soils and also exists as a mineral of manganese in the tropics.

U.S. Pat. Nos. 5,645,518 and 5,830,815 issued to Wagh et al. on Jul. 8, 1997 and Nov. 3, 1998, respectively, disclose processes for utilizing phosphate ceramics to encapsulate waste. U.S. Pat. No. 5,846,894 issued to Singh et al. on Dec. 8, 1998 discloses a method to produce phosphate bonded structural products from high volume benign wastes. None of these patents provides a method for utilizing the waste materials of iron and manganese.

U.S. Pat. No. 6,153,809 issued to Singh et al. Nov. 28, 2000 and U.S. patent application Ser. No. 09/751,655 filed Dec. 29, 2000, publication no. U.S. 2002/0123422 to Wagh et al. represent additional development of the use of chemically bonded phosphate ceramics to useful materials. Each of the aforementioned patents, that is U.S. Pat. No. 5,645,518 issued to Wagh et al., U.S. Pat. No. 5,846,894 issued to Singh et al., U.S. Pat. No. 5,830,815 issued to Wagh et al., U.S. Pat. No. 6,153,809 issued to Singh et al., U.S. Pat. No. 6,133,498 issued to Singh et al. and the above-identified publication no. U.S. 2002/0123422 (patent application Ser. No. 09/751,655) is incorporated herein in their entireties.

The phosphate ceramics disclosed in the various patents and publication hereinbefore mentioned illustrate a continuing effort to use the chemically bonded phosphate ceramics disclosed therein for a variety of purposes including the encapsulation of hazardous or radioactive waste as seen in the aforementioned publication, as well as the production of low cost structural materials. Accordingly, therefore, a need exists in the art for a low cost structural material which combines with synthetic organic resin based structures, for particular usage in the construction industry. Typically, in warm weather climates, low cost housing may be constructed using styrofoam as a base material onto which is sprayed a concrete-like material as a finish coating to seal the styrofoam base material against the elements and to provide a satisfactory looking structure. Heretofore, the phosphate ceramics disclosed in the above-captioned patents and publication were used as a finish coating in warm temperature climates but have not been satisfactory because the bond between styrofoam and the phosphate ceramics herein above disclosed is physical and peelable such that durable coatings have not been able to be provided with the extant material.

SUMMARY OF THE INVENTION

An object of the present invention is to provide a structural material and method for chemically bonding the phosphate ceramics hereinbefore disclosed to foam material and particularly to polystyrene foam.

Another object of the present invention is to provide a method to coat styrofoam structures with a material which cures or sets at room temperature and is easy to apply in the field.

Yet another object of the present invention is to provide an aqueous based material which may be applied to a styrofoam or other synthetic organic resin in the field at low cost and with high efficiency.

Another object of the invention is to provide a method for preparing and chemically bonding a phosphate ceramic to a polymer foam.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

Figure 1:
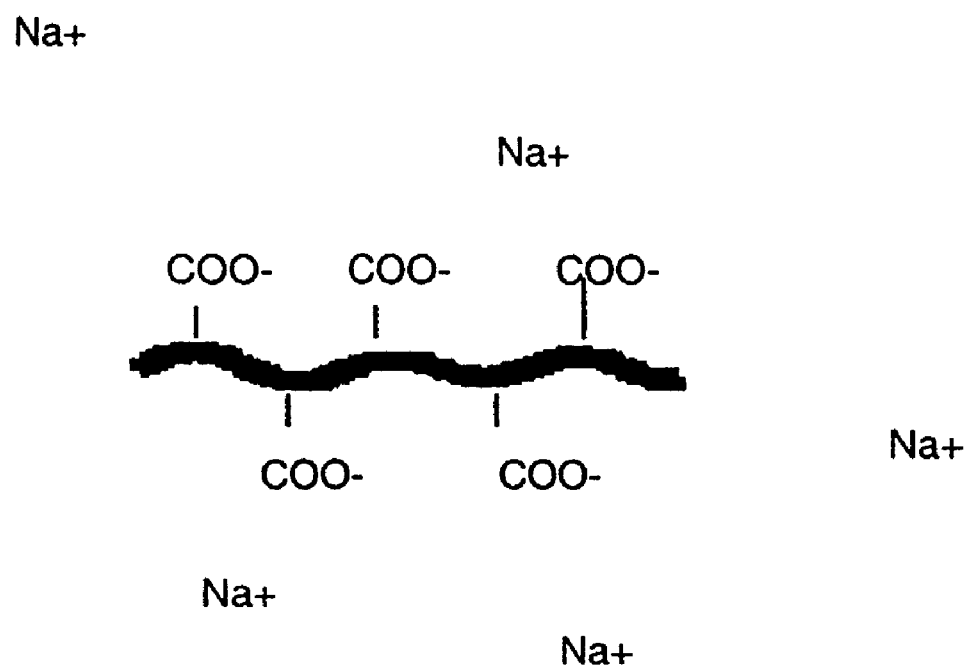
FIG. 1 is a schematic representation of the dissolution of poly (acrylic acid) sodium salt.

Although the invention has been described particularly with respect to polyacrylic acid sodium salt, as hereinbefore stated, other acrylates and the salts thereof are also applicable to the present invention and the invention is not limited to the disclosed materials of polyacrylic acid salt, polymethylmethacrylate, polyacryl amide and polyacrylnitryl. However, while the above description is particularly suited to providing a material which chemically bonds with polystyrene foam by the incorporation of styrene into the aqueous slurry, other systems may be used with the present invention wherein the ceramicrete or ferroceramicrete is combined with water soluble powders and a stabilizing or cross-linking polymer in an aqueous solution in order to chemically bond the resultant material to the synthetic organic resin structure.

DETAILED DESCRIPTION OF THE INVENTION

The process and product disclosed herein provides an inexpensive construction material, particularly adapted for use in warm weather climates where styrofoam or other synthetic organic resin foams are used as construction materials and require a coating of a hard, dense material for a surface finish. There are a large variety of materials which may be used to form the slurry which is thereafter chemically adhered to the synthetic organic resin foam base or surface. One such material is haematite which may be used in combination with sand, fly ash, and a variety of other materials hereinbefore described, combined with a reducing agent and magnesium oxide or other metal oxides with phosphoric acid or monopotassium phosphate and acrylate to form the ceramic phosphate formulations hereinbefore described. The reducing agents to be used in ferroceramicrete may be a variety of materials including elemental metals, tin chloride, ferric sulfate or other typical low costs moities.

An aqueous slurry of the ceramic has a compressive strength similar to that of Portland cement, approximately 4000 psi. However, the slurry frequently sets very rapidly and can be retarded in the rapidity with which it sets, as set forth in the previously incorporated '498 patent. In general, as previously stated, the ceramicrete and ferroceramicrete disclosed in the above-mentioned applications can be used in solid particulate form at the construction site and either premixed with solid styrofoam and acrylate prior to arrival at the construction site or mixed at the construction site. As previously disclosed, the phosphate ceramic of the invention may be made from a source of phosphate and one or more of an oxide, hydroxide or carbonate of one or more of Si, Fe, Mg, Al, Mn, Ca, Zr or mixtures thereof.

The inventors have discovered that by adding an acrylate such as polyacrylic acid sodium salt, or any other suitable salt, polymethylmethacrylate or polyacryl amide or other suitable acrylates such as polyacrylnitrile or others in combination with polystyrene to form an aqueous slurry of the Ceramicrete® or Ferroceramicrete binder with the acrylate and styrofoam, the resultant material when applied to a styrofoam base forms not merely a physical bond as previously occurred in the art, but a chemical bond which is firmly adhered to the styrofoam base thereby providing a inexpensive and easy mechanism by which at styrofoam based forms on site. Ceramicrete® and Ferroceramicrete are trademarks of Argonne National Laboratory but are used herein to denote the phosphate ceramics made by the processes disclosed in the above-incorporated patents and publication.

By way of note, the '809 patent teaches a surface coating material used to reduce the leaching of soluble salts from ceramicrete waste forms. However, the resin there disclosed cannot be mixed with the Ceramicrete® aqueous slurry because the resins are not water based. Moreover, the materials there disclosed are not suitable for use with polystyrene foam because it collapses the foam structure. The materials used in the '809 patent are styrene solvent and benzoyl peroxide, both of these components being toxic and not useful in the construction industry.

The present invention fulfills a significant requirement in the construction industry in warm climates in that the present invention provides polymers which with Ceramicrete® (will bond chemically to a polystyrene foam surface. The invention consists of water soluble materials that can be applied in an aqueous Ceramicrete® slurry and do not adversely affect the setting properties of the Ceramicrete® slurry. Moreover, when set, the added polymers do not significantly alter the mechanical and physical properties of the Ceramicrete® or Ferroceramicrete material, and more particularly, the polymers do not introduce porosity in the Ceramicrete® or Ferroceramicrete material and do not render the set material water soluble.

Figure 2:
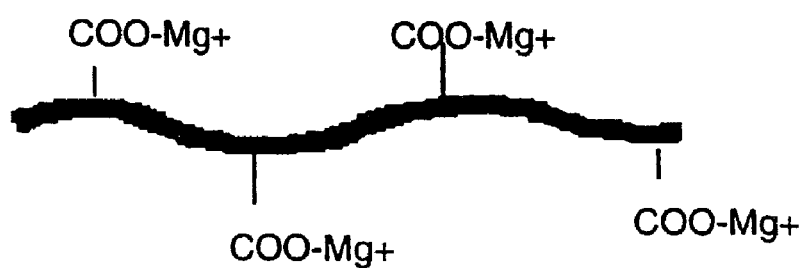
FIG. 2 is a schematic representation of the bonding of the dissolved poly (acrylic acid) with ceramicrete.

As previously stated, there are a number of polymers which are water soluble and compatible with the aqueous slurry of Ceramicrete® or Ferroceramicrete particles. These water soluble polymers include the acrylates such as polyacrylic acid (AA) salt, preferably the sodium salt, polymethylmethacrylate (PMMA), polyacryl amide and others such as polyacrylnitryl. The acrylate salts when dissolved in water produce carboxylate anions $COO^-$ by releasing sodium ions into the solution. The dissolution may be written as $COONa \rightarrow COO^- + Na^+$. The dissolution is illustrated in FIG. 1. In addition to dissolution of AA in aqueous solution of Ceramicrete slurry, dissolution of MgO in the acidic Ceramicrete slurry forms $Mg(aq)^{++}$. The two ions will react to produce $COOMg^+$ complexes. The complex may be of the type $COO^-$—Mg—$OOC$, in which case, one Mg cation will satisfy two carboxylate ion. In another mechanism, only one carboxylate ion may be bonded to Mg cation and the cation in turn bonds to one of the anions from the Ceramicrete matrix. The first possibility stabilizes AA partially (FIG. 3) and the second possibility will provide a bonding between Ceramicrete matrix and the polymer (FIG. 2). These reactions may be written as follows:

Dissolution of MgO: $MgO + 2H^+ = Mg(aq)^{++} + H_2O$

Complete complexation of AA and Mg:

Partial complexation of AA and Mg::—COO—+Mg(aq)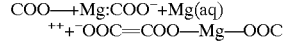

Figure 3:
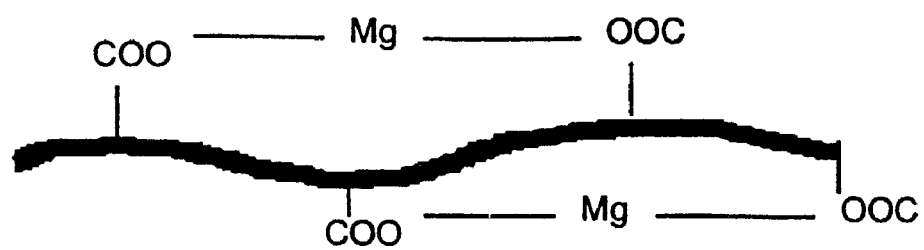
FIG. 3 is a schematic representation of the stabilization of acrylic acid with magnesium and styrene.
Figure 3:
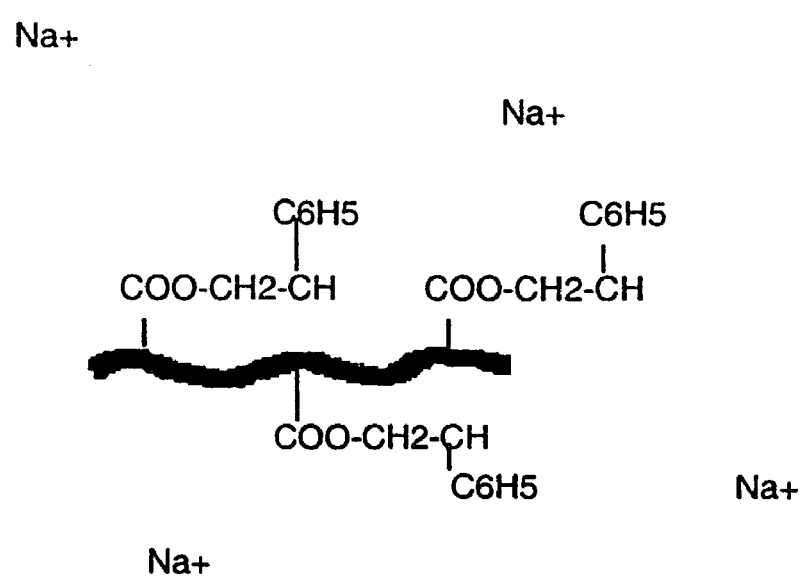

AA by itself, however, needs to be polymerized to form a stable component in the matrix. To form a copolymer, styrene ($C_6H_5CH=CH_2$) is added to the composition. Styrene will bond to AA as shown in FIG. 3. This reaction forms a stable polymer within the Ceramicrete® matrix.

The bonding between the Ceramicrete composite matrix and Styrofoam is facilitated by the reaction of styrene and AA in the same manner as above again as shown in FIG. 3. A similar complexation also occurs if an amide is used instead of styrene and also with use of PMMA, or other suitable acrylate.

Table 1 lists various attempts to bind Ceramicrete® and styrofoam. In each case, Ceramicrete® slurry was made in a conventional way, with 7–9 wt. % MgO, 18 et,. % $KH_2PO_4$, 50 wt. % sand and the rest Class F fly ash. To this as added 12 wt. % water. The slurry was mixed for 25 minutes. Each batch was approximately 500 Grams. AA and styrene beads were added at different times as shown in Table 1. The slurry was then poured over a surface of dense styrofoam and was allowed to set. Typical thickness of the Ceramicrete® layer was 0.5 cm. The following criteria were used to test if the product was acceptable as a structural material to be sprayed on styrofoam walls.

1. The slurry should warm up in 25 minutes
2. It should set into a hard ceramic within another hour,
3. The bond between Styrofoam and Ceramicrete composite should be chemical.

The last criterion was tested by inserting a spatula between the Ceramicrete® and styrofoam and lifting it up to open the interface. If the whole cast of Ceramicrete® separated from the Styrofoam, then it was considered to be only a physical bond. If on the other hand, the Ceramicrete® cast or styrofoam broke at the tip of the spatula and the rest of the material retained good adhesion, then it was considered to be a good chemical bond.

As seen in Table 1, the bonding was chemical only when styrene or excess MgO were used along with AA. In the first case, it shows that Ceramicrete® itself with styrofoam sheet. In the second case, adding of only AA did not achieve the desired result. In fact, it adversely affected the setting of Ceramicrete®. In the third case, Ceramicrete® reacted with AA and excess MgO to provide a chemical bond. Although 10% excess MgO is reported in Table 1, excess MgO may be present in the range of from 1 to about 20% by weight, more preferably 1 1 to about 10% by weight, and most preferably about 10% by weight. In the last two cases, however, styrene reacted with AA and provided the necessary chemical bonding between styrofoam and Ceramicrete®, and also stabilized AA within Ceramicrete®.

TABLE 1

Various admixtures of Poly-ceramicrete and the results

| Ceramicrete and Polymer composition | Mode of Application | Heat generation at 25 min and setting time | Nature of Bonding |
|---|---|---|---|
| Ceramicrete ® only | Poured on Styrofoam | Warmed up, One hour setting | Physical |
| Ceramicrete ® with AA only | Same as above, AA added to slurry, | Less warming, Long time to set | Physical, Ceramicrete ® was set but slightly wet |
| Ceramicrete ® with AA and 10% additional magnesium oxide | Same as above, AA added to slurry | More warming, short time to set | Chemical |
| Styrene beads dissolved in hot AA solution | The solution was mixed with Ceramicrete ® powder and slurry was formed, mixed for 25 min. and poured | Warmed up, one hour setting | Chemical |
| Mixture of styrene and AA added to Ceramicrete ® powder | Mixed slurry for 25 min. and poured on Styrofoam | Warmed up, One hour setting | Chemical |

As may be seen therefore, there has been disclosed a structural material and a method of making same in which the aqueous slurry of particles of a solid phosphate ceramic composite and a polyacrylic acid or acrylate or combinations or salts thereof are combined with either polystyrene or excess MgO to form a reaction product which chemically bonds to a polystyrene base. More particularly, the solid phosphate ceramic composites may include the reaction product of a source of phosphate such as phosphoric acid or monopotassium phosphate and an acrylate. Further, the ceramic component may be one or more of a metal oxide or hydroxide. The structural material disclosed herein may include the oxide wherein the oxide or hydroxide is one or more of Si, Fe, Mg, Al, Mn, Ca, Zr or various mixtures or combinations thereof. As before stated in the incorporated patents, the solid phosphate ceramic generally includes alkali metal ions and more particularly and preferably alkali metal potassium ions. Various polyacrylates may be used including polyacrylic acid or polymethymethacrylate or the sodium salt of polyacrylic acid. Additionally, polyacrylamide may also be employed.

In general, the acrylic acid or acrylate or combinations of salts thereof may be present in the aqueous solution in the range of from about 3% by weight to about 8% by weight. More preferably, in the range of from about 4% by weight to about 6% by weight. More preferably, the polyacrylic acid or polyacrylate or combinations of salts thereof is present in the aqueous slurry at a concentration of about 5% by weight. The polystyrene which may be used to form the chemical bond in combination with the other materials hereinbefore set forth may be generally present in the aqueous solution in the range of from about 1% by weight to about 10% by weight.

The structural material disclosed in the above specification is particularly useful, as hereinbefore stated, in combination with polystyrene base materials in warm climate construction. As before stated, the slurry of particles of solid phosphate ceramic component along with a suitable acrylate or salt thereof in combination with either or both of styrene and excess magnesium oxide will provide the chemical bond required to obtain the benefits of the present invention. When excess MgO over and above the stoichiometric amount are needed in the slurry is used, it may be present in a range of from about 1% to about 20% by weight, more preferably in the range of from about 1% to about 10% by weight and most preferably about 10% by weight. The method of chemically bonding a structural material to a polystyrene base has been disclosed in which an aqueous solution of particulate solid phosphate ceramic composite particles and either polystyrene particles or an excess of MgO or both and a polyacrylate or a polyacrylic acid or salt thereof has been used to form a aqueous reaction product which when applied to polystyrene base reacts to form a dried reaction product chemically bound to the polystyrene base, all as hereinbefore disclosed.

While particular embodiments of the present invention have been shown and described, it will be obvious to those skilled in the relevant art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A structural material, comprising the dried reaction product of an aqueous slurry, said slurry prior to reaction comprises:
   a) particles of a solid phosphate ceramic composite,
   b) a poly (acrylic acid or acrylate) or combinations or salts thereof, and
   c) polystyrene.

2. The structural material of claim 1, wherein the solid phosphate ceramic composite includes the reaction product of a source of phosphate and one or more of a metal oxide or hydroxide.

3. The structural material of claim 2, wherein the oxide or hydroxide is one or more of Si, Fe, Mg, Al, Mn, Ca, Zr or mixtures thereof.

4. The structural material of claim 3, wherein the solid phosphate ceramic composite includes alkali metal ions therein.

5. The structural material of claim 4, wherein said alkali metal ions are potassium.

6. The structural material of claim 1, wherein the polyacrylate is polymethyl methacrylate.

7. The structural material of claim 1, wherein the polyacrylic acid salt is a sodium salt.

8. The structural material of claim 1, wherein the poly (acrylate) is a polyacrylamide.

9. The structural material of claim 1, wherein the poly (acrylic acid or acrylate) or combinations or salts thereof is present in the aqueous slurry in the range of from 3% by weight to about 8% by weight.

10. The structural material of claim 1, wherein the poly (acrylic acid or acrylate) or combinations or salts thereof is present in the aqueous slurry in the range of from 4% by weight to about 6% by weight.

11. The structural material of claim 1, wherein the poly (acrylic acid or acrylate) or combinations or salts thereof is present in the aqueous slurry in a concentration of about 5% by weight.

12. The structural material of claim 1, wherein the polystyrene is present in the aqueous slurry in the range of from 1% by weight to about 10% by weight.

13. A structural material, comprising the dried reaction production of an aqueous slurry, said slurry prior to reaction comprises:

a) particles of a solid phosphate ceramic composite, b) a poly(acrylic acid or acrylate) or combinations or salts thereof, and c) MgO, said MgO is present in the slurry in the amount which exceeds the stoichiometric amount required for reaction of said MgO with all carboxylic functionality of the component b).

14. The structural material of claim 13, wherein the solid phosphate ceramic composite includes the reaction product of a source of phosphate and one or more of a metal oxide or hydroxide.

15. The structural material of claim 14, wherein the excess amount of said MgO exceeds said stoichiometric amount by from about 1% to about 20% by weight.

16. The structural material of claim 15, wherein the amount of said MgO exceeds said stoichiometric amount by from about 1% to about 10% by weight.

17. The structural material of claim 16, wherein the amount of said MgO exceeds said stoichiometric amount by about 10% by weight.

18. The structural material of claim 15, and wherein said slurry further comprises polystyrene particles.

* * * * *